United States Patent [19]
Holmes

[11] 3,892,982
[45] July 1, 1975

[54] HYDROPONIC NUTRIENT FEEDING CONTROL SYSTEM

[76] Inventor: Floyd W. Holmes, 7302 Rolliston St., Jacksonville, Fla. 32208

[22] Filed: Jan. 29, 1974

[21] Appl. No.: 437,688

[52] U.S. Cl. .................. 307/118; 340/235; 47/1.2; 137/392
[51] Int. Cl.² .................. A01G 31/00; F16K 21/18
[58] Field of Search ............ 307/118, 141; 340/235; 73/73; 47/1.2, DIG. 4, DIG. 5, DIG. 10, 38, 48.5; 137/392

[56] References Cited
UNITED STATES PATENTS
2,611,643  9/1952  Higgins .......................... 340/235 X Primary Examiner—Herman J. Hohauser
Attorney, Agent, or Firm—Edwin E. Greigg

[57] ABSTRACT

A hydroponic nutrient-feeding control system controlled jointly by an electrolytic sensor and a presettable timer. Spaced electrodes sense the need for nutrient feeding by an increase in interelectrode resistance as the plant bed partially dries out and/or the liquid level drops too low. The sensed condition activates a timer switch to pump nutrient solution for a preselected time. A manual switch is provided to override the automatic subcircuit so that manual feeding can be effected if and when desired. A protective fuse and condition-indicating signal lights are included. The sensor is a pair of spatially adjustable J-shaped carbon or noble metal containing rods.

9 Claims, 2 Drawing Figures

HYDROPONIC NUTRIENT FEEDING CONTROL SYSTEM

BACKGROUND OF THE INVENTION

It is known to control the feeding of nutrient solutions to hydroponic beds by programmed timers, or by liquid level responsive controls (e.g. float-operated valves). However, it is not known to control feeding by easily electrically adjustable electrolytic sensors in conjunction with a time-controlled pump which feeds nutrient solution for a preselected time period each time need for feeding is sensed.

OBJECTS OF THE INVENTION

It is accordingly the principal object of the invention to provide a hydroponic feeding system in which an electrolytic sensor detects the need for feeding and a presettable time-controlled pumping subcircuit operates each time the need for feeding is sensed.

Another object of the invention is to provide a sensor whose electrodes are easily spatially adjustable and are shaped to provide both good anchorage in the gravel bed and protection against damage to the bed liner.

A further object is to provide a compact apparatus having easily accessible, repairable and replaceable parts, which include a protective fuse, indicator lamps, switches and control dials mounted on the hinged front panel of a shallow metal cabinet.

Other objects and advantages will become apparent as the following description proceeds.

SHORT DESCRIPTION OF THE DRAWINGS

Figures 1, 2:
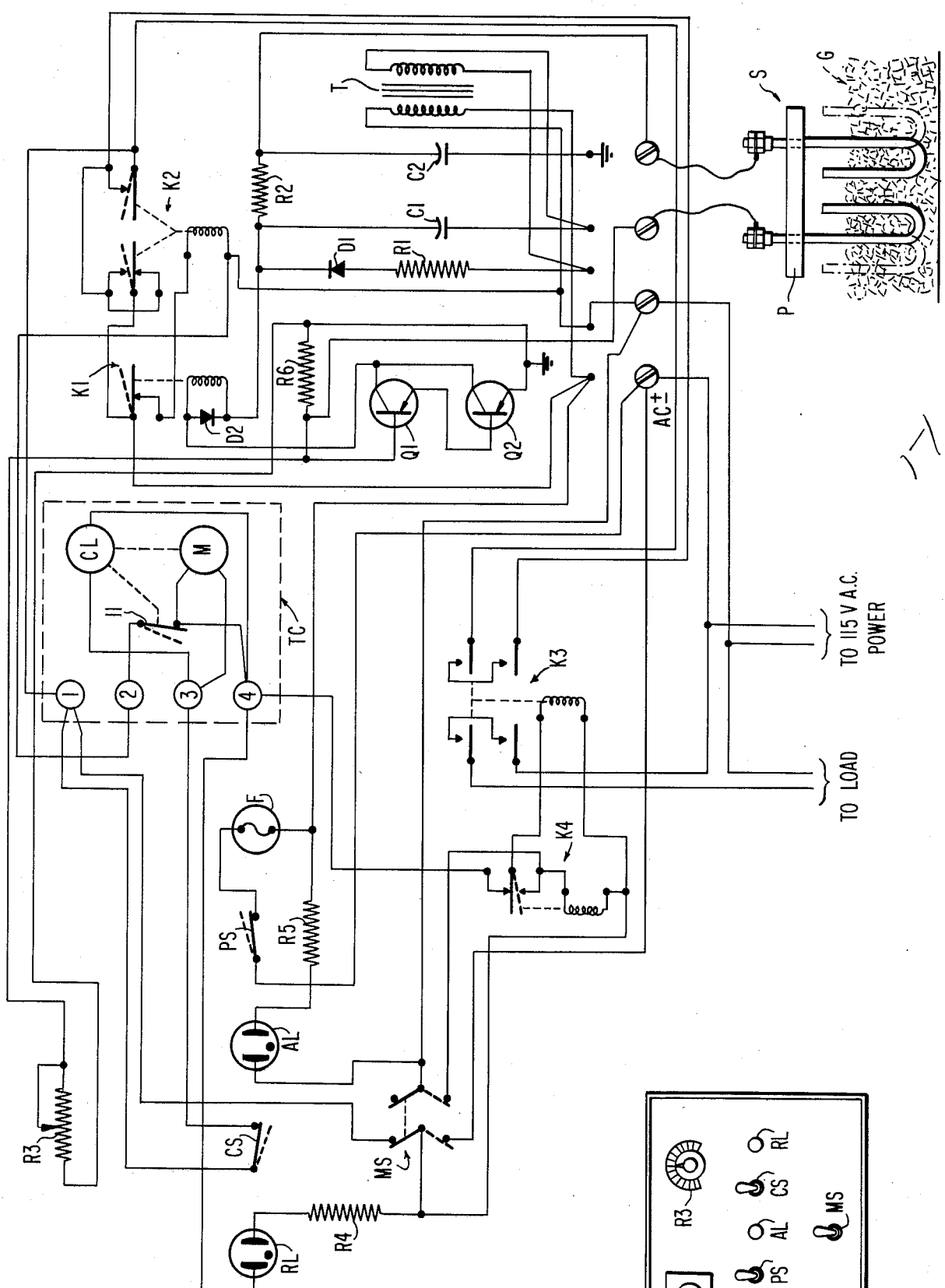
FIG. 1 is a combined schematic wiring diagram and elevational view of the sensor.
FIG. 2 is a front elevational view of the hinged front panel of the metallic housing for the apparatus.

With reference now to FIG. 1 of the drawing, the contacts of the various switches and relay switches are shown in their normal or non-pumping positions in solid lines, and in their pumping positions in phantom or broken lines. The latter positions, of course, are held for a minor portion of the total time of operation of the system.

Of the main parts, the first consists of a timing control unit TC, having an easily adjustable (by a knob 13, FIG. 2) timing range of from five to thirty minutes. Unit TC comprises a motor M, and a magnetic clutch CL driven by the motor M and, when energized, closing the timing switch 11. Unit TC is a commercially available unit, being Zenith Timing Control TFC–30–M, 115 V. A.C.

The solid state amplifier used in this control is the second most important part of the system. Its D.C. power supply comprises a transformer T (1.2 amperes at 6.3 volts), two 4.7 ohm resistors R1 and R2, a rectifying diode D1, and two smoothing capacitors C1 and C2 (100 and 50 mf, respectively). The solid state amplifier comprises two GE2 transistors, Q1 and Q2 interconnected in Darlington circuit, as shown in FIG. 1. The input signal to the transistors is derived from the pair of spaced moisture-sensing electrodes (hereinafter described in detail), embedded in the gravel of the plant bed. The input signal is varied by rheostat R3 (5,000 ohms or more) connected in series with the spaced electrodes and bridged by resistor R6. The output from the amplifier normally sufficiently energizes the coil of relay K1 to hold its switch closed (during non-pumping periods).

While the switch of relay K1 is closed, the holding solenoid of relay K2 holds its switches in their full-line positions, with the right switch thereof open. When the plant bed periodically dries out sufficiently to increase the electrolytic resistance between the sensor electrodes to a value conjunctively preselected by the in-series rheostat R3, the relays K1 and K2 are sequentially de-energized, allowing the right switch of relay K2 to close. This switch then energizes the motor M and the clutch CL of the time control TC to start a preset timing period of operation of a conventional nutrient solution feeding pump and to open a conventional solenoid-operated valve in series with the pump and a reservoir of nutrient liquid. The pump and the valve are connected in parallel to the leads designated "TO LOAD" in FIG. 1. The load circuit is closed by the left bridging contact of the relay K3 when the holding coil of K3 is energized by closing of the right switch of the relay K2, through the double-pole, double-throw manual switch MS in its solid line automatic position, through the upper contact of the relay K4, and finally through the time control switch 11. Thus each time the sensing subcircuit signals a preselected degree of drying out of the plant bed, a pumping cycle of preselected duration is initiated.

Energization of the system is controlled by a power switch PS and is protected by a fuse F. An amber neon lamp AL and a red neon lamp RL are connected as shown in FIG. 1 to indicate system power-on and pumping circuit energization, respectively.

A double-throw manual switch MS is provided to permit manual energization of the pumping circuit, if and when desired. In its broken line position, the switch MS disables the automatic pumping subcircuits and acts through the relay K4 to also control the power relay K3. The manual switch MS also has a third or intermediate position (not illustrated) in which both the automatic and the manual subcircuits are disabled.

The electrolytic sensor S comprises a pair of J-shaped electrodes E formed of any corrosion-resistant material, such as stainless steel, noble metals, noble metal-plated base metal, or carbon compositions of the type used as dry-cell electrodes. The upper ends of the electrodes E are frictionally held in vertical bores in an insulating plate P so that the average spacing (one to five inches, for example) can be varied by relative rotation thereof between their solid and broken line positions shown. The upper ends of the electrodes E are provided with conventional metal caps and binding posts. The lower ends of the electrodes are shown embedded several inches in the top of a gravel bed G. The rounded lower extremities of the electrodes protect the lining of the plant bed (which is often a plastic sheet) from being punctured and also help to support the sensor in desired position.

What is claimed is:

1. In a hydroponic feeding system having a plant bed, container means for liquid nutrient solution and solution forcing means for forcing said solution into said bed, the improvement comprising, in combination: an electrolytic sensor at least partially embedded in said bed for producing current signals representative of moisture content of said bed, a presettable timer means having its output coupled to said solution forcing means for controlling same, and circuit means having its input coupled to said electrolytic sensor and being responsive to signals therefrom for producing at its output a control signal in response to a signal from said electrolytic sensor indicative of a need for nutrient feeding, said circuit having its output coupled to said presettable timer means for supplying its control signal thereto to cause said electrolytic timer means to feed solution to said bed for a preselected time period each time said electrolytic sensor detects a need for nutrient feeding, whereby the initiation of a feeding cycle and its duration are separably and independently controlled.

2. The invention according to claim 1, in which said sensor comprises a pair of J-shaped electrodes whose reversely bent and rounded lower ends provide improved anchorage in an aggregate bed and safety against puncturing a bed liner.

3. The invention according to claim 2, in which said electrodes are rotatably mounted in a support member for lateral adjustment of their average spacing.

4. The invention according to claim 1 and additionally comprising a manual switch for disabling the automatic sensor-controlled feeding and for at will manually controlling said solution forcing means.

5. The invention according to claim 4, said manual switch having a self-maintainable intermediate position which disables both automatic and manual controlling of said solution forcing means.

6. The invention according to claim 1 and in which said circuit means additionally comprises a rheostat connected to said sensor circuit means and adjustable to vary the strength of the signal from said sensor to vary the degree of drying needed to initiate a timed feeding operation.

7. The invention according to claim 1 and in which said sensor circuit means comprises a pair of transistors connected in Darlington circuit.

8. The invention according to claim 1, said solution-forcing means comprising a pump, an electric motor driving said pump, and a power relay switch controlled by said sensor circuit means to energize and to de-energize said electric motor through said power relay switch.

9. The invention according to claim 1, in which a majority of adjustable and frequently replaceable apparatus parts are mounted on the hinged cover panel of the housing for the remaining parts.

* * * * *